United States Patent [19]

Williams et al.

[11] 4,277,455
[45] Jul. 7, 1981

[54] PROCESS FOR PURIFYING PHOSPHORIC ACID

[75] Inventors: Thomas A. Williams, Beckermet; Frank M. Cussons, Little Broughton, both of England

[73] Assignee: Albright & Wilson Limited, Warley, England

[21] Appl. No.: 84,188

[22] Filed: Oct. 12, 1979

[30] Foreign Application Priority Data

Oct. 16, 1978 [GB] United Kingdom ............... 40622/78

[51] Int. Cl.³ ............................................. C01B 25/16
[52] U.S. Cl. ................................................. 423/321 S
[58] Field of Search ......................... 423/321 R, 321 S

[56] References Cited

U.S. PATENT DOCUMENTS

| | | | |
|---|---|---|---|
| 1,929,442 | 10/1933 | Milligan | 423/321 S |
| 2,885,266 | 5/1959 | Victory | 23/165 |
| 3,914,382 | 10/1975 | Williams | 423/321 S |
| 4,127,640 | 11/1978 | Williams | 423/321 S |

FOREIGN PATENT DOCUMENTS

| | | |
|---|---|---|
| 49-31594 | 3/1974 | Japan . |
| 953378 | 3/1964 | United Kingdom . |
| 1199042 | 7/1970 | United Kingdom . |
| 1209272 | 10/1970 | United Kingdom . |

OTHER PUBLICATIONS

Haddad, "Wet Process Phosphoric Acid", S.R.I., 1966.
Chemical Engineers Handbook, 1950, pp. 714–718.

*Primary Examiner*—O. R. Vertiz
*Assistant Examiner*—G. A. Heller
*Attorney, Agent, or Firm*—Frishauf, Holtz, Goodman & Woodward

[57] ABSTRACT

Wet process phosphoric acid is purified by extraction with a hexanone of pentanone to form an organic extract, containing phosphoric acid, from which the acid content is recovered by treatment with water or aqueous phosphoric acid in 2 or more portions to give 2 or more purified acids, the recovery to give the last purified acid being in more than 1 countercurrent stage.

15 Claims, 1 Drawing Figure

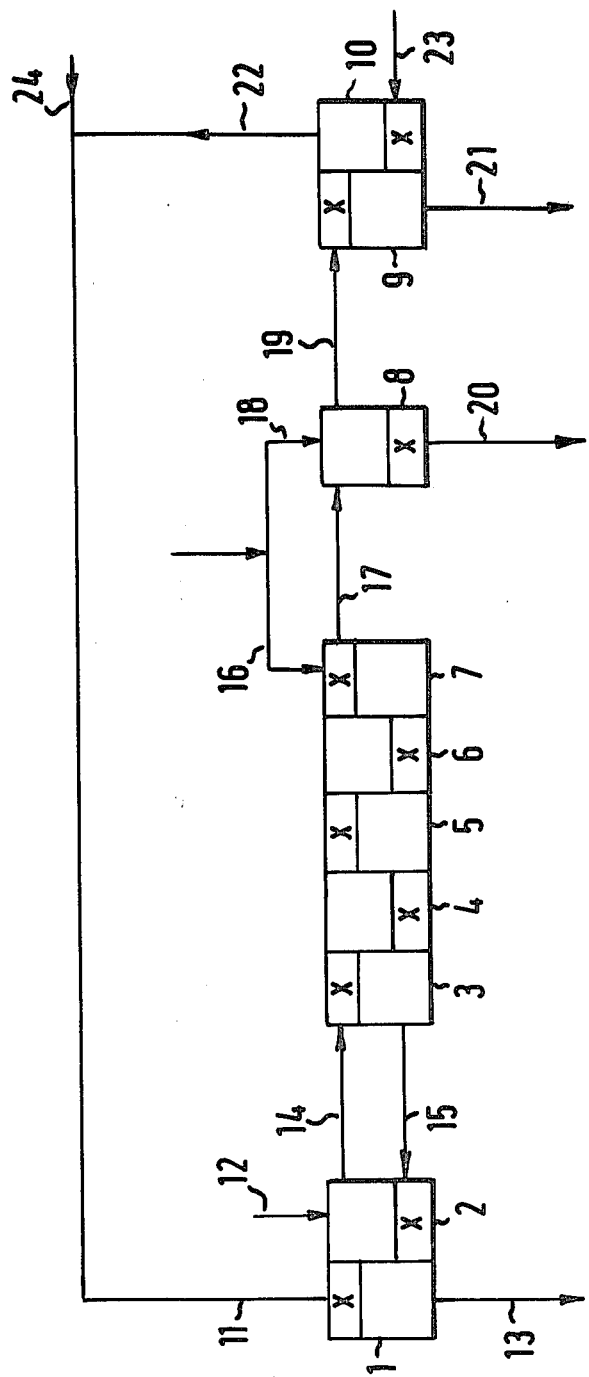

PROCESS FOR PURIFYING PHOSPHORIC ACID

This invention concerns the purification of phosphoric acid, in particular by means of extraction with a water immiscible solvent.

In our British Patent Specification Nos. 1,436,113 and 1,436,114 we describe a process for purifying feed wet process phosphoric acid by treatment with a dialkyl ketone of 5 or 6 carbon atoms to form a solvent extract containing phosphoric acid and treatment of that extract with water to produce purified phosphoric acid.

We have found that the acid in the solvent extract can be released to give two or more purified acids by release in two or more steps.

The present invention provides a process for purifying feed wet process phosphoric acid prepared from contact of phosphate rock and sulphuric acid which comprises treating the feed wet process acid with a ketone which is a dialkyl ketone of 5 or 6 carbon atoms, e.g. methyl isobutyl ketone to form a ketone extract containing at least some of the acid in the feed acid, and then releasing the acid in the extract by successive contact with aqueous phases, which are water or aqueous phosphoric acid, in at least two steps to produce in a penultimate step an acid laden ketone layer and an aqueous acid layer and to produce overall at least two aqueous product purified phosphoric acid layers and a ketone layer, and the product purified acid layers are separated, the final step of contact of acid laden ketone layer and an aqueous phase involving contact of the acid laden ketone layer and water in more than one countercurrent stage, e.g. 2–4 but preferably two such stages, to form a final product purified acid and said ketone layer, said final purified acid containing usually at least 10% of the phosphoric acid present in the ketone extract.

The solvent used to treat the wet process acid is a dialkyl ketone of 5 or 6 carbon atoms, i.e. an acyclic unsubstituted hexanone or pentanone such as methyl isobutyl ketone or other methyl butyl ketones, ethyl n propyl ketone, methyl n-propyl ketone, methyl isopropyl ketone and diethyl ketone. The preferred solvent is methyl isobutyl ketone.

Usually, the ketone layer separated from the final purified acid is substantially free of phorphoric acid, e.g. contains not more than 10%, preferably not more than 5% and especially not more than 3% of the $H_3PO_4$ values in the ketone extract from the extract. The final purified acid usually contains at least 50% $H_3PO_4$, e.g. 50–60% such as 55–59% when the solvent is a dialkyl hexanone or at least 46%, e.g. 46–55% when the solvent is a dialkyl pentanone, e.g. 50–55% for diethyl ketone. Usually, the ketone layer after separation is recycled to contact fresh feed acid.

In the penultimate step of the process, there is produced an acid laden ketone layer and an aqueous acid layer, which are separated. The acid laden ketone layer passes to the final step while the aqueous acid layer may all be removed as an aqueous product purified acid or some or all or it may be recycled to an earlier step in the process, e.g. into a scrubbing section of the process or into the extraction stage, but only some of the aqueous acid layer may be passed into the extraction stage. Thus at least a portion e.g. at least 10% (and preferably all) of two of the product purified acids are not recycled to the extraction stage where ketone and crude feed acid are contacted to form the ketone extract.

The process involves release from the ketone extract in two or more steps e.g. 2–4 steps to give two or more purified acids, e.g. 2–4 acids but preferably two such acids, and these are removed from the solvent purification system. The ketone phases, which term includes the crude ketone extract, the extract after scrubbing if this is employed as described below, and the acid laden ketone layer already depleted partly of its acid content, are contacted with aqueous phases which are in total usually at least two portions of water, e.g. 2–4, but especially 2 or 3 portions of water, though, but less preferred, all but one portion of water may be replaced by purified phosphoric acid.

In each step which produces a product purified acid, the ketone extract or scrubbed extract is treated with an aqueous phase which is water or aqueous phosphoric acid. For the avoidance of doubt, the water is generally substantially free from ions, in particular those ions and compounds which form precipitates with impurity ions in the extract or which will extract such impurity ions from the extract into the aqueous phase. Thus in particular hydrogen chloride (for removing calcium), hydrogen fluoride, hydrogen peroxide (for removing titanium/vanadium), calcium chloride or calcium phosphate or other calcium compounds, aluminium, iron, titanium or zirconium compounds (to remove fluorine), alkali metal compounds or ammonium compounds, and bases are all substantially absent in the aqueous phase. Preferably such ions or compounds are completely absent, but amounts of up to 0.1% by weight (e.g. up to 100 ppm) may be present, particularly when the aqueous phase is a purified phosphoric acid made by release from an organic extract into an aqueous layer in a subsequent stage of the process. The water may be mains water or preferably condensate water, e.g. from a phosphoric acid concentrator.

Usually the ketone extract or the scrubbed extract is treated in three or more steps with at least two portions of water, each portion of water giving a purified product acid. Advantageously, two portions of water are used to give two purified acids. The addition of the final portion of water to the acid laden ketone layer is in more than one actual or theoretical countercurrent stage, e.g. 2–4 but preferably two stages. The addition of the or each previous portion of water may also be in more than one countercurrent stage, or in a single stage, i.e. in the form of a cross current strip with water in one stage. Advantageously, the acid laden ketone layer which is used in the final contact to produce the final purified acid, is itself made by contact in a single stage of water, or less preferred a portion of the final purified acid, with an acid laden solvent layer with a higher acid content than said acid laden ketone layer. Thus, in a preferred process the ketone extract or especially the scrubbed extract is treated with two portions of water, the first portion contacting the extract in one stage to give a first purified acid and an acid laden ketone layer depleted of some of its acid content, the first acid and ketone layer are separated, and then the acid laden ketone layer is contacted in more than one countercurrent stage, e.g. two countercurrent stages to give a second product purified acid and a ketone layer, usually substantially free of phosphoric acid for recycle, and the second acid and ketone layer are separated. In this preferred process it is possible to obtain two product purified acids of substantially the same $P_2O_5$ content though that from the penultimate step is slightly higher e.g. by up to 3% $P_2O_5$ such as 0.2–3% $P_2O_5$.

In order to increase the purity of the final purified acid at least, the ketone extract is preferably scrubbed before contact with the aqueous phases, e.g. the two or more portions of water in the release operation. The extract may be scrubbed with a scrub liquor which is purified phosphoric acid of acid content such that substantially no phosphoric acid transfers from the scrub liquor to the extract and of impurity content such as impurities are removed from the extract. Alternatively, the extract may be scrubbed with water in two or more countercurrent stages to produce initially an aqueous phosphoric acid which is itself used as the scrub liquor to scrub the incoming extract; usually the phosphoric acid scrub liquor contains an amount of $H_3PO_4$ of at least 10% by weight of the $H_3PO_4$ in the ketone extract, e.g. 10-50% and especially 30-50%. The weight ratio of scrub liquor to ketone extract is normally from 0.05-0.5:1, especially 0.25-0.5:1 when using a scrub liquor containing 50-60% $H_3PO_4$. The weight ratio of water to ketone extract is usually 0.01-0.08:1 e.g. 0.02-0.08:1 such as 0.02-0.06:1. The scrubbing with water or purified acid normally occurs in at least two countercurrent stages, e.g. 2-10 stages and preferably 2-7 e.g. 3-5 stages. Normally the used scrub liquor after removing impurities from the extract is recycled to the extraction stage, and, in this case, especially when water is used for the scrubbing, 5-40% e.g. 20-35% of the acid in the ketone extract is often transferred to the used scrub liquor. In an embodiment of the process of the invention at least a portion of, and optionally all of, the used scrub liquor is taken off as a product purified acid stream and the rest if any is recycled to the initial stage of contact of feed acid and ketone. As mentioned above the used scrub liquor from the first stage of scrubbing can be taken off as a purified acid stream, but alternatively some of the aqueous acid phase from any of the stages of scrubbing can be taken off as product purified acid.

Thus, in another embodiment of the process of the invention, water is added to the extract for scrubbing in many countercurrent stages and all or some of the used scrub liquor taken as a purified product acid stream, the scrubbed extract is treated with a second portion of water in a single stage of cross current strip to give a second product purified acid, which is separated, and the acid laden ketone layer remaining is contacted with the final portion of water in more than one countercurrent stage, e.g. two countercurrent stages to give a third purified product acid which is separated. Alternatively, the process in the previous sentence, referred to hereafter as the previous process, may be carried out with two portions of water and without the single stage cross current strip to give two purified product acids, the first from the used scrub liquor and the second from the final countercurrent release. Alternatively, the previous process with the single stage cross current strip may be carried out to give three purified product acids with only two portions of water, one for the cross current strip and one portion for the countercurrent release, the scrub liquor for scrubbing the extract being a portion of the purified acid from the cross current strip. Finally, the previous process without the cross current strip may be carried out to give two purified product acids with only one portion of water, that added in the final countercurrent release, the scrub liquor being a portion of the final purified acid. In this last process the two aqueous phases being used for release are the portion of final purified acid and the single portion of water.

Where a purified acid stream is taken from the scrubbing section of the process in the above processes all the used scrub liquor may be used as that stream or only a portion may be so used and the rest recycled to the extraction. Where a purified stream is taken from a non terminal stage of the scrubbing section, only a portion of the aqueous phase may usually be taken, the rest being recycled to a previous stage of the scrubbing section and used scrub liquor recycled to the extraction stage; however, if a purified stream is taken from a non terminal stage of the scrubbing and a portion of water is added to the extract phase on the cruder side of the stage in question, then it is possible to remove all the aqueous acid from that stage as a purified stream.

In particularly preferred processes of the invention, the ketone extract is treated in a scrub operation with a first aqueous phase which is water or purified phosphoric acid in more than one countercurrent stage to form a scrubbed extract and a used scrub liquor, the used scrub liquor is either all recycled to the extraction step (as is most preferred) or all removed as a first aqueous product purified phosphoric acid or some (e.g. 10-90% especially 40-60%) is recycled to the extraction step and the rest removed as a first product acid, the scrubbed extract is then treated in the penultimate step with aqueous phase, which may be purified phosphoric acid e.g. a portion of final product purified acid, but is preferably water, to form an acid laden ketone layer and a penultimate aqueous acid layer, which are separated and at least a portion (e.g. 10-100% such as 60-100% and especially all) of the aqueous acid layer removed as an aqueous product purified phosphoric acid and the rest (if any) recycled for use as the aqueous phase in the scrub step, the acid ketone layer is then contacted with water in more than one countercurrent stage to form a final product purified acid and a ketone layer which are separated. The amount of scrubbing is usually such that the total metal impurity content of the final product acid is less than 50 ppm and the total metal impurity content of the penultimate acid is in the range 50-300 ppm with the difference between the impurity contents being usually 50-250 ppm and the ratio of the impurity contents of the penultimate and final acids being less than 50:1 e.g. 2:1 to 20:1 such as 5:1 to 10:1. The impurity content of the penultimate purified acid, and usually all the purified acids is often less than 20% of the impurity content of the feed acid.

The process of the invention normally provides two or more purified acid streams of high concentrationm usually of 50-60%, e.g. 55-59% $H_3PO_4$ content when the solvent is a dialkyl hexanone e.g. methyl isobutyl ketone or 46-55% when the solvent is a dialkyl pentanone, and the acid streams differing in their impurity content, the last purified acid from the countercurrent release stage being the purer or purest acid. Thus purer or purest acid may have a total metal impurity content of less than 50 ppm, e.g. less than 30 ppm and may thus be used as a technical grade acid for use, e.g. in polishing baths or for treatment with base to form industrial phosphate salts such as sodium tripoly phosphate or for further purification, e.g. by crystallization as described in our British Patent Specification No. 1,436,115. The less pure purified acids may be used for liquid fertilizers as such or after further purification. Alternatively, any proportion of the two or more purified streams may be mixed to give a blend of intermediate impurity content for use, e.g. to make the industrial phosphates or for the crystallization process. The process of the invention may thus give one or more product acids with an impurity content or contents which can be varied, e.g. from 10-300 ppm total metals to take advantage of varying market requirements.

The final purified acid stream preferably contains 10-80% of the $H_3PO_4$ present in the ketone extract; usually at least 20% of the acid in the Extract just before the step in which the first product purified acid is produced, (especially in the scrubbed ketone Extract), e.g. 20-80% or 20-75% e.g. 20-50% or 40-65%, preferably 45-50% of acid in said Extract. The other purified acid stream or streams preferably contains 20-90% of the acid in the ketone extract, usually not more than 80% of the $H_3PO_4$ present in the Extract just before the step in which the first product purified acid is produced, (especially in the scrubbed ketone extract), e.g. 80-20% or 80-25% e.g. 80-50% or such as 60-35%, preferably 45-50%, of the acid in such an Extract. The ketone Extract just before this step, in which the first product purified acid is released, is thus the extract produced directly by the extraction if there is no scrubbing or if a portion of the used scrub liquor is separated as a product purified acid, and is the scrubbed extract if there is scrubbing and the used scrub liquor is all recycled to the extraction. It may be advantageous to produce two purified acid streams containing about the same amount of phosphoric acid e.g. 45-50% of that in the scrubbed extract, though of different impurity content. Preferably in each step at which a product purified acid is separated and removed from the purification system, or a used scrub liquor is obtained, such an acid aqueous phase contains at least 15% of the acid originally in the ketone extract produced directly in the extraction.

Advantageously, if there is scrubbing with water and all the used scrub liquor is recycled to the extraction, then, of the acid in the ketone extract produced directly in the extraction, 5-40% such as 15-40% e.g. 20-40% is removed from the Extract in the used scrub liquor, and 20-50% e.g. 20-40% and especially 30-40% is in each of the first and second product purified acids. The process of the invention also produces an aqueous raffinate from the extraction stage which contains a substantial proportion of impurities and may be made into fertilizers. All the acids produced by the process contain small amounts of dissolved ketone which may be removed, e.g. under vacuum.

Phosphoric acid for purification according to the invention is obtained by filtration or other separation of calcium sulphate from the slurry obtained by the attack of sulphuric acid on phosphate rock. In such a state, it contains a wide range of impurities, some of which such as fluorine and sulphate ions and dissolved organic material may if desired by removed from the acid prior to the solvent extraction of the present invention; other impurities such as iron, chromium, magnesium and other metallic cations, however, are not removable by such a pretreatment.

Conventionally the acid from the attack stage is cooled and aged as much as possible in order to induce post precipitation of the impurities present before the extraction. The acid will normally be cooled to about 25°-30° C. before contact with solvent.

The temperature at which the solvent extraction is optimally carried out may vary according to the acidity of the wet process acid feed. However, we have found that a temperature below 60° C., e.g. 0°-60° C. such as 25°-50° C. is normally convenient for all concentrations of acid and that one of 35°-50° C. is particularly useful.

The acid to be employed in the present process will either be obtained from the attack stage at the required concentration but usually will be concentrated up to this level, (i.e. to an acidity of at least 50% for pentanones and at least 65% for hexanones before the solvent purification. Preferably the feed acid has an acidity in the range of 65-85%, e.g. 70-85% such as 74-80%, e.g. of concentration 78.5% $H_3PO_4$ and 0.5% $H_2SO_4$ or 77% $H_3PO_4$ and 2% $H_2SO_4$ (i.e. about 79% acidity) for use with the hexanones and 50-75%, e.g. 60-75%, especially 60-70% with the pentanones.

The acidity of the acid is herein defined as the total weight % of $H_3PO_4$ and $H_2SO_4$ species present therein, this simple addition being possible as a result of $H_3PO_4$ and $H_2SO_4$ both having a molecular weight of 98.

Wet process acid of the required acidity is contacted with the ketone and, the weight ratio of ketone to aqueous wet process phosphoric feed is at least 0.3:1 preferably in the range 0.5 to 2.0:1, when used scrub liquor is also recycled to the extraction stage. For hexanones the weight ratio is more preferably in the range 1.0 to 1.5:1 optimally 1.2 to 1.4:1 for a one stage extraction or 1.3 to 1.5:1 for a multistage countercurrent extraction. The use of a ratio greater than 2.0:1 may be employed if desired; however, no benefit is obtained and a larger plant will be required. For pentanones when there is recycle of used scrub liquor and for pentanones and hexanones when there is no such recycle, the preferred weight ratio of ketone to aqueous feed acid is 0.5:1 to 1.2:1. The weight ratio of ketone to total aqueous acid entering the extraction stage, i.e. the sum of the feed acid and recycled used scrub liquor, if any, is usually 0.5:1 to 1.2:1, e.g. 0.7:1 to 1.1:1:1.

It is often desirable to employ a multistage countercurrent extraction process with more than one countercurrent stage, e.g. 2-4 actual or theoretical countercurrent stages. Two such stages are very suitable. Usually, the extraction is carried out in one or more pairs of mixer/settler units though other contactors, e.g. agitated columns may be used.

Usually the extraction stage is carried out so that at least 30% e.g. 30-95% and especially 60-92% of the acid in the feed acid is extracted. The ketone extract usually contains 20-45% $H_3PO_4$, e.g. 25-40% and especially 28-40%, a content of 33-40% is particularly suitable with hexanones such as methyl isobutyl ketone.

The phosphoric acid in the extract, after scrubbing if this operation is used, is released from the organic phase by contacting it with two or more aqueous phases, the last of which at least is water though water or aqueous phosphoric acid may be used for earlier stages. Suitable apparatus includes mixer-settlers, packed columns, etc. as previously described. The total amount of water employed, i.e. including water for scrubbing as well as water for release is usually in a weight ratio of 0.1-0.3:1 with respect to the hexanone extract, and 0.05-0.3:1 with respect to pentanone extracts.

In the most preferred process methyl isobutyl ketone contacts feed acid of acidity 74-80% to give a ketone extract containing 28-40% $H_3PO_4$, the ketone extract is scrubbed with water or purified phosphoric acid to give a scrubbed extract and a used scrub liquor, which is recycled to the initial stage of treatment of feed acid with methyl isobutyl ketone, the scrubbed extract is treated with a first portion of water in one stage to give a first purified product phosphoric acid and an acid laden ketone layer which are separated, the acid laden ketone layer is treated in two countercurrent stages with a second portion of water to give a final purified product phosphoric acid layer and a ketone layer substantially free of $H_3PO_4$, and the layers are separated, and said ketone layer recycled to the initial stage of contact of ketone and feed acid.

While the temperature of the release water is usually ambient, e.g. about 20° C., water at other temperatures, for example, condensates obtained from a heat exchanger used for vacuum evaporations may also be employed. Typically, temperatures will be in the range 10°–50° C., e.g. 20° to 40° C. as will normally pertain as a result of the heat absorbed in the release from contact of water at 20° with extract at 20°–60° C. The release may be carried out in the same type of equipment as the extraction, but preferably mixer settlers are used in both processes.

The process of the invention may be carried out in apparatus for which a block flow diagram is shown in the accompanying drawing. Each of Vessels 1–10 is a mixer-settler. Vessels 1 and 2, and 3–7 and 9–10 are arranged for countercurrent contact between their contents.

In use recycled solvent enters Vessel 1 through line 11 while into Vessel 2 is passed through line 12 crude wet process phosphoric acid and through line 15 used scrub liquor from Vessel 3. The countercurrent contact in Vessels 1 and 2 produces an aqueous impurity laden raffinate which leaves Vessel 1 by line 13 and a crude organic extract containing acid which passes from Vessel 2 via line 14 to the Vessel 3. In Vessels 3–7, which act as a scrubbing system, the crude extract is contacted in countercurrent with water entering Vessel 7 through line 16 to give an aqueous used scrub liquor which leaves Vessel 3 through line 15 and a scrubbed ketone layer which passes from Vessel 7 through line 17 into Vessel 8, the first of the release vessels. In Vessel 8, the scrubbed ketone layer meets water entering through line 18 in a cross current operation to give a first aqueous purified acid leaving through line 20 and a ketone layer depleted of some of its $H_3PO_4$ content which passes through line 19 to Vessel 9 of a pair of Vessels 9–10 arranged to contact the ketone layer in a two stage countercurrent operation with water entering Vessel 10 through line 23. The flows in Vessels 9–10 give a second aqueous purified acid leaving Vessel 9 through line 21 and a ketone layer usually substantially free of $H_3PO_4$ which leaves Vessel 10 through line 22. The ketone layer in line 22 meets makeup solvent entering through line 24 and the mixture proceeds through line 11 back into Vessel 1.

The invention is illustrated in the following Example in which the apparatus shown in block form in the accompanying drawing is used. The feed phosphoric acid had an analysis as given in Table 2.

Analyses of the liquids in lines 11–22 and the flow rates of the liquid are given in the Table I below.

TABLE I

| Line | 11 | 12 | 13 | 14 | 15 | 16 | 17 | 18 | 19 | 20 | 21 | 22 | 23 | 24 |
|---|---|---|---|---|---|---|---|---|---|---|---|---|---|---|
| Flow Rate Imp.Galls/hr | 96.3 | 35.9 | 11.5 | 136 | 16.5 | 5.67 | 124 | 6.34 | 108 | 22.1 | 22.3 | 94.6 | 6.71 | 1.78 |
| Litres/hr | 438 | 163 | 52.3 | 620 | 75.05 | 25.8 | 565 | 28.8 | 491 | 100 | 101.2 | 430 | 30.5 | 8.09 |
| %$P_2O_5$ | 1.7 | 56.3 | 43.0 | 26.1 | 43.8 | 0 | 21.6 | 0 | 14.0 | 42.0 | 41.5 | 1.7 | 0 | 0 |
| Specific Gravity | 0.82 | 1.65 | 1.50 | 1.06 | 1.46 | 1.0 | 1.02 | 1.0 | 0.945 | 1.4 | 1.395 | 0.82 | 1.0 | 0.805 |

The temperatures in Vessels 1–2 are 30°–40° C. and in Vessels 8–10 are 35°–30° C. The process produces three product streams whose analysis are as shown in Table 2 below; Table 2 also shows the analysis of the input feed acid in line 12.

TABLE 2

| Stream Nature | Line 12 Feed acid | Line 13 Raffinate | Line 20 First Purified Acid | Line 21 Second Purified Acid |
|---|---|---|---|---|
| %$P_2O_5$ | 56.3 | 43.0 | 42.0 | 41.5 |
| %$H_3PO_4$ | 77.7 | 59.3 | 57.9 | 57.2 |
| %$H_2SO_4$ | 1.6 | 2.1 | 1.05 | 0.8 |
| Fe | 0.23% | 0.8% | 150 ppm | 20 ppm |
| Mg | 0.25% | 0.9% | 30 ppm | <<5 ppm |

We claim:

1. In a process for purifying feed wet process phosphoric acid prepared from contact of phosphate rock and sulphuric acid which comprises treating the feed wet process acid with a ketone solvent which is a dialkyl ketone of 5 or 6 carbon atoms to form a crude ketone extract containing at least some of the acid in the feed acid, purifying said crude ketone extract, and then releasing the acid in the purified extract to form aqeous purified phosphoric acid, the improvement which comprises scrubbing said crude ketone extract with water or purified phosphoric acid scrub liquor to produce a scrubbed purified extract, and a used aqueous acid scrub liquor which is all recycled to said contact of wet process phosphoric acid and a ketone, and then contacting said scrubbed purified extract with water or phosphoric acid in a single stage to give a first aqueous product purified phosphoric acid and an acid laden ketone layer which are separated, and then contacting said acid laden ketone layer with water in more than one countercurrent stage to form a second aqueous product purified phosphoric acid and a ketone layer, which are separated, each of the first and second product purified acids containing 35–65% of the phosphoric acid in the scrubbed, purified extract.

2. The process according to claim 1 wherein said ketone layer formed in the final contact is substantially free of $H_3PO_4$ and is recycled to contact fresh wet process acid.

3. The process according to claim 1 or 2 wherein the final purified acid contains 20–75% of the acid present in the crude ketone extract.

4. The process according to claim 1 wherein the final purified acid is formed by contact of an acid laden ketone layer and water in two actual countercurrent stages.

5. The process according to claim 1 wherein said scrubbed purified extract is contacted with water to give said first product purified acid.

6. The process according to claim 1 wherein the purified acid scrub liquor or that prepared by contact of the scrub water and extract contains an amount of $H_3PO_4$ of 10–50% of the $H_3PO_4$ in the crude ketone extract.

7. The process according to claim 6 wherein the amount of $H_3PO_4$ is 25–50% of the $H_3PO_4$ in the crude ketone extract.

8. The process according to claim 1 wherein the ketone solvent is methyl isobutyl ketone.

9. The process according to claim 1 or 5 or 8 wherein the total amount of water used to release the acid is 0.1–0.3:1 by weight based on the weight of the crude ketone extract.

10. The process according to claim 1 wherein the ketone solvent is a pentanone and the total amount of water used to release the acid is 0.05 to 0.3:1 by weight based on the weight of the crude ketone extract.

11. The process according to claim 1 or 5 or 8 wherein the crude ketone extract contains 25–40% $H_3PO_4$.

12. The process according to claim 1 or 5 or 8 wherein the solvent is a hexanone, the feed acid has an acidity of 74–80% and each of the aqueous product purified acids contains at least 50% $H_3PO_4$.

13. The process according to claim 1 wherein the ketone solvent is a pentanone and the feed acid has an acidity of 60–75%.

14. The process according to claim 1 wherein methyl isobutyl ketone contacts feed acid of acidity 74–80% to give a crude ketone extract containing 25–40% $H_3PO_4$, the crude ketone extract is scrubbed with water or purified phosphoric acid to give a scrubbed extract and a used scrub liquor, which is recycled to the initial stage of treatment of feed acid with methyl isobutyl ketone, the scrubbed purified extract is treated with a first portion of water in one stage to give a first purified product phosphoric acid and an acid laden ketone layer which are separated, the acid laden ketone layer is treated in two countercurrent stages with a second portion of water to give a final purified product phosphoric acid layer and a ketone layer substantially free of $H_3PO_4$ and the layers are separated, and said ketone layer recycled to the initial stage of treatment of feed acid with ketone.

15. A process according to any one of claims 1, and 14 wherein at least a portion of two product purified acids is not recycled to the extraction stage of contact of feed acid and ketone.

* * * * *